UNITED STATES PATENT OFFICE.

BEN WOOD, OF ANGOLA, INDIANA, ASSIGNOR OF ONE-HALF TO SOL A. WOOD AND ORVILLE CARVER, OF SAME PLACE.

ADJUSTABLE HANDLE-BAR FOR BICYCLES.

SPECIFICATION forming part of Letters Patent No. 567,433, dated September 8, 1896.

Application filed March 25, 1896. Serial No. 584,774. (No model.)

*To all whom it may concern:*

Be it known that I, BEN WOOD, a citizen of the United States, and a resident of Angola, in the county of Steuben and State of Indiana, have invented certain new and useful Improvements in Adjustable Handle-Bars for Bicycles; and I do hereby declare that the following is a full, clear, and exact description of the invention, which will enable others skilled in the art to which it appertains to make and use the same, reference being had to the accompanying drawings, which form a part of this specification.

My invention relates to improvements in the handle-bars of bicycles; and its object is to provide an improved construction of the same by which they may be raised or lowered to suit requirements.

The invention consists in the novel construction and combination of parts hereinafter fully described and claimed.

In the accompanying drawings, Figure 1 is a perspective view of the upper end of a bicycle steering-bar, showing my improvements applied thereto. Fig. 2 is a transverse sectional view. Fig. 3 is a similar view at a right angle thereto. Fig. 4 is an elevation, the handle-bars and the screw-threaded collar being removed.

In the said drawings, the reference-numeral 1 designates the steering-bar of a bicycle, screw-threaded at its upper end, with which engages a correspondingly-threaded socket 2, provided with a head 3, formed with two intersecting cylindrical apertures or openings 4.

The numeral 5 designates curved handle-bars provided with handles 6, of any suitable construction, and having their inner ends, which fit in said holes or openings, formed with peripheral teeth or corrugations 7 on their adjacent sides. Located in said socket is a vertically-movable pin or bolt 8, the upper end of which is oppositely beveled and formed with teeth 9, corresponding and engaging with the teeth 7. The lower end of this bolt rests upon a pin 10, which passes through alined vertical slots in the socket 2 and projects slightly beyond the same. Fitting on said socket is an interiorly-screw-threaded collar 12, which engages with corresponding exterior screw-threads on the socket, and having its lower edge turned inwardly, forming an annular flange 13, which engages with the ends of the said pin 10, so that as the rod is raised or lowered the pin will be correspondingly moved. The collar may be made circular, as shown, or of hexagonal or other polygonal shape, if desired, to receive a wrench for turning the same, and is formed with an opening 15, whereby the pin 10 may be inserted and withdrawn. Passing through a screw-threaded opening in the head 3 is a set-screw 16, the inner end of which is made conical or tapering, which engages with a peripheral groove in each of the handle-bars near the inner end of the same and prevents them from being disengaged from the head.

The operation will be readily understood. The inner ends of the handle-bars are inserted in the openings in the head 3, with the teeth or cogs thereof intermeshing or engaging with each other. The set-screw 16 is then turned so that its point will engage with the grooves in the handle-bars, preventing the latter from being withdrawn, yet allowing them to rotate. The handle-bars are then adjusted to suit the convenience or ease of the rider by turning them in the openings in the head. When thus adjusted, the collar 12 is screwed up and the flange 13 thereof, engaging with the ends of the pin 10, will raise the latter, and consequently the bolt resting thereon, so that the teeth 9 will engage with the teeth 7 and lock the handle-bars against rotation and holding them in their adjusted position. A reverse movement of the collar will allow the bolt and pin to be lowered to them, the teeth of the bolt being out of engagement with the teeth of the handle-bars.

Having thus fully described my invention, what I claim is—

1. In a bicycle the combination with the tubular steering-bar, the socket secured thereto, formed with alined slots, exterior screw-threads and a head with intersecting cylindrical openings, of the curved handle-bars, the inner ends of which are provided with intermeshing teeth, the bolt having its upper end beveled and provided with teeth, the pins, the ends of which project through said slots, and the screw-collar having an inwardly- (No Model.)
T. W. YOUNG.
APPARATUS FOR EXTRACTING OIL.
No. 567,434. Patented Sept. 8, 1896.
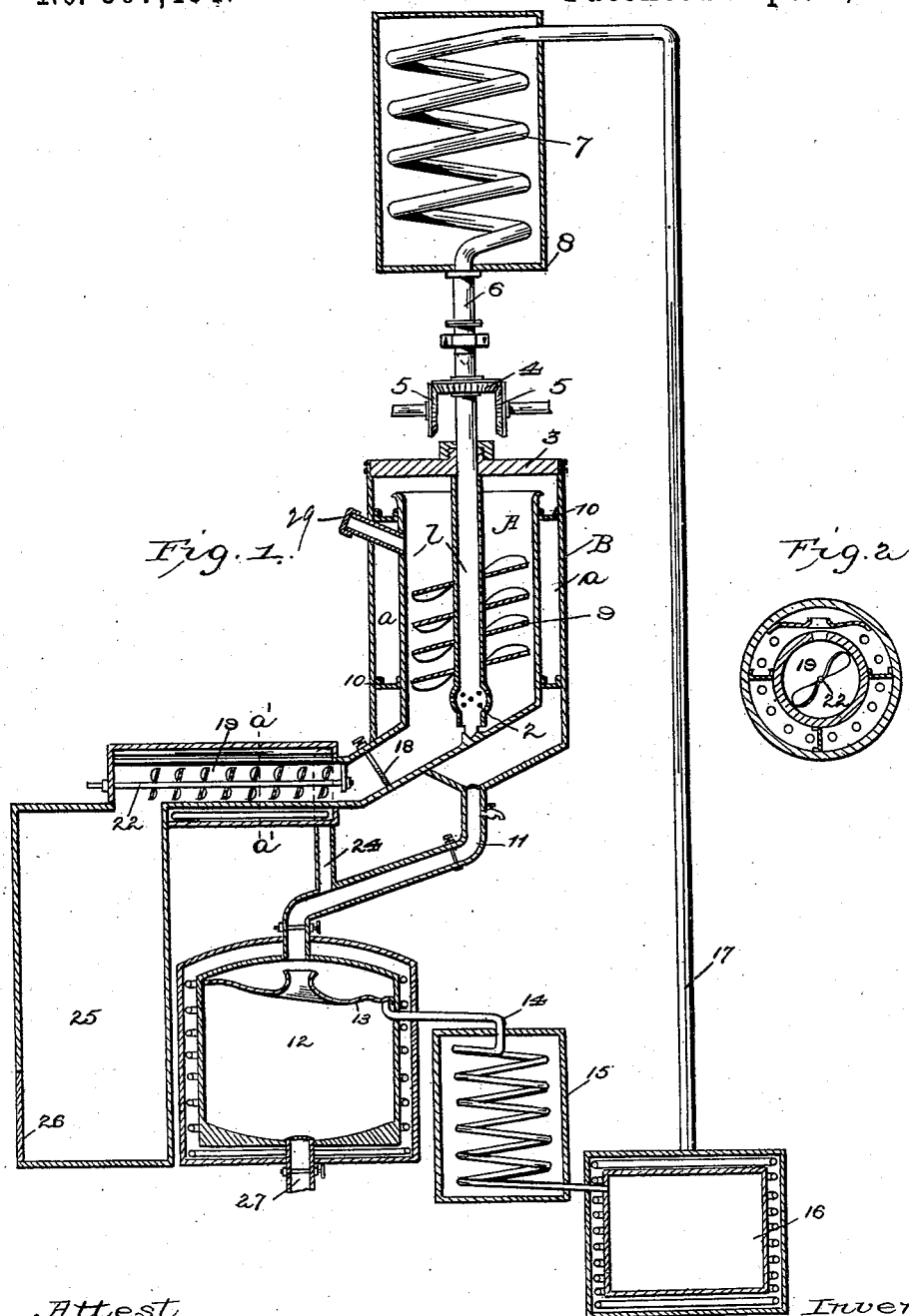
Attest
F. L. Middleton
C. S. Middleton
Inventor
Tapley W. Young
By Ellis Spear
Atty.